United States Patent Office 3,830,739
Patented Aug. 20, 1974

3,830,739
PREPARATION OF HYPERBASIC DISPERSIONS
Paul C. Kemp, Ponca City, Okla., assignor to Witco Chemical Corporation, New York, N.Y.
No Drawing. Continuation-in-part of abandoned application Ser. No. 56,010, July 17, 1970. This application Jan. 24, 1972, Ser. No. 220,436
Int. Cl. C10m 1/40, 3/34
U.S. Cl. 252—33.4    18 Claims

ABSTRACT OF THE DISCLOSURE

A hyperbasing process which comprises:

(a) admix sulfonic acid, methanol, calcinum base, and volatile hydrocarbon solvent;
(b) treat with less than stoichiometric amount of carbon dioxide at temperature not over 35° C.;
(c) add nonvolatile diluent oil;
(d) heat to remove all volatiles;
(e) treat with carbon dioxide to convert remaining calcium base to calcium carbonate; and
(f) filter.

CROSS-REFERENCE TO RELATED APPLICATIONS

The present invention is a continuation-in-part of application Ser. No. 56,010, filed July 17, 1970 and now abandoned.

DISCLOSURE

Background

The use of hyperbasic dispersions as additive agents in lubricating oil compositions is well-known. In general, such materials serve at least the following functions. First the oil must possess the ability to disperse insolubles formed by fuel combustion and/or oil oxidation. Secondly, the oil must be capable of neutralizing both the acidic combustion products and acidic lacquer precursors.

While hyperbasic dispersions containing either barium compounds or calcium compounds are used in lubricating oil compositions the hyperbasic calcium-containing dispersions are often preferred, primarily because of their lower cost. Moreover, while calcium hydroxide is the dispersoid material in many lower base number dispersions, in general calcium carbonate is the preferred dispersoid material in higher base number dispersions.

Several processes are known for preparing hyperbasic dispersions containing calcium carbonate as the dispersoid material. While these processes are satisfactory for preparing small batches (e.g., 1 liter) of product, it has been my observation that only a relatively few processes are satisfactory for preparing large batches (e.g., at least 100 gallons) of product.

My invention resides in the discovery of a process for preparing hyperbasic dispersions containing calcium carbonate wherein the process uses economical materials (e.g., lime and methanol) and is satisfactory for preparing large batches (e.g., 100 gallons and above).

An important feature of my process is the use of a cerfully controlled amount of carbon dioxide in the carbonation step. This amount of carbon dioxide, which will be described more fully hereinafter, is less than the stoichiometric amount required to convert the overbasing calcium present to calcium carbonate. Use of such an amount of carbon dioxide permits longer heating times in the preparation of the product. Since generally longer heating times are required to prepare large batches of product, it is believed that it is this feature (i.e., amount of carbon dioxide added initially) which enables my process to prepare large batches of product.

Moreover, my process provides for a high utilization of lime. By this is meant that a large amount of the lime (CaO or Ca(OH)$_2$) added is converted to calcium carbonate found in the filtered product. Generally my process provides a lime utilization of at least about 90%, more generally at least about 95%.

Many methods are known for expressing the amount of overbasing metal present in hyperbasic dispersions. The term "overbasing" refers to the amount of metal present in excess of that present in the neutral metal salt of the dispersing agent. I prefer to use the base number method of expressing the amount of overbasing metal present. The term "base number" refers to mg. KOH per gram of sample. The base number can be either the ASTM base number, which uses an ASTM method, or acetic base number, which term is described in many U.S. and foreign patents (e.g., U.S. 3,150,088). Preferably, the acetic base number is used.

PRIOR ART

While many references teach processes for preparing hyperbasic dispersions containing calcium carbonate, U.S. Pat. Nos. 2,865,956 and 3,537,996 are believed to be the most pertinent references to the process described herein. Broadly stated, Pat. No. 2,865,956 teaches the preparation of hyperbasic dispersions containing polyvalent metal carbonates by reacting an oil-soluble polyvalent metal salt of an organic acid (e.g., carboxylic or sulfonic acid), with a polyvalent metal carbonate formed in situ in the reaction mixture.

The patent teaches that $C_1$-$C_6$ alkanols can be used. By contrast, I have found that ethanol and isopropanol do not work in my process. Moreover, the use of methanol requires process conditions outside of those described by U.S. 2,865,956, when methanol is used in the examples of the patent.

U.S. Pat. No. 3,537,996 teaches a process for preparing an overbased calcium hydrocarbon sulfonate. The process comprises contacting an initial admixture of calcium sulfonate, hydrated lime, hydrocarbon lubricating oil and an alcohol selected from the group consisting of alkanols and alkoxy alkanols of from 1–5 carbon atoms, said hydrated lime having a calcium carbonate content of less than 1.5 weight percent, with carbon dioxide until between about 50 and 83 percent of said hydrated lime is converted to calcium carbonate, clarifying the resulting mixture by means of filtration and recovering said clarified, overbased calcium sulfonate composition from the filtrate.

The teachings of Pat. No. 3,537,996 are not believed pertinent for the following reasons. The patent teaches that the temperature for blowing with $CO_2$ should be in the range of 120–200° F. (54–93° C.) By contrast, the maximum temperature for the first carbonation step of my process is about 35° C. Moreover, the patent teaches that the alcohol can be an alkanol or alkoxy alkanol containing from 1–5 carbon atoms. The process of the subject application is restricted to the use of methanol. Data contained herein show that the nearest homologs to methanol (ethanol and ispropanol) do not work in my process.

In addition to the foregoing patents, the following U.S. patents are listed as being concerned with related art: 3,027.325; 3,057,896; 3,312,618; 3,470,097; 3,488,284; 3,492,231. Inasmuch as these references are believed to be less pertinent than those discussed in the foregoing, it is not considered necessary to discuss them herein.

BRIEF SUMMARY OF THE INVENTION

Broadly stated, the present invention is directed to a process for preparing a stable dispersion of calcium carbonate in a nonvolatile diluent oil, wherein the process comprises:

(A) forming an admixture of
   (1) oil-soluble dispersing agent
   (2) volatile hydrocarbon solvent
   (3) methanol
   (4) calcium oxide or calcium hydroxide in an amount to provide the desired base number.
(B) treating the admixture of step (A) with a carefully controlled amount of carbon dioxide while controlling the temperature of the reaction admixture,
(C) adding nonvolatile diluent oil to the carbonated admixture,
(D) heating the admixture to remove substantially all of the volatile materials, and
(E) blowing the admixture with carbon dioxide to convert substantially all of the remaining calcium oxide or calcium hydroxide to calcium carbonate.

While not necessary to my process, nonvolatile diluent oil can be present in the admixture of step (A). Preferably, at least about half of the amount present in the final product is added after the first carbonation step (i.e., step (B)).

Stated more specifically, the present invention is directed to a process for preparing large batches (e.g. at least 100 gallons) of a stable dispersion of calcium carbonate in a nonvolatile diluent oil, wherein the process comprises:

(A) forming an admixture of
   (1) about 5 to about 30 parts by weight of an oil-soluble dispersing agent
   (2) about 10 to about 50 parts by weight of a volatile hydrocarbon solvent
   (3) about 5 to about 30 parts by weight of methanol
   (4) at least about 0.25 parts of a nonvolatile diluent oil, and
   (5) calcium oxide or calcium hydroxide in an amount to provide an acetic base number of at least 50 in the final product,
(B) treating the admixture of step (A) with an amount of carbon dioxide which is above 0.75 and less than 0.95 mole, per mole of overbasing calcium, while the admixture is at a temperature not exceeding about 35° C.,
(C) adding to the admixture of step (B) an amount of nonvolatile diluent oil sufficient to bring the total of nonvolatile diluent oil to about 20 to about 85 parts per 100 parts of the combined weight of oil-soluble dispersing agent and nonvolatile diluent oil,
(D) heating the admixture to remove substantially all of the volatile materials, and
(E) blowing the admixture of step (D) with carbon dioxide to convert substantially all of the remaining calcium oxide or calcium hydroxide to calcium carbonate.

An important feature of the process is the amount of carbon dioxide employed in step (B). Suitably this will be above 0.75 and less than 0.95 mole per mole of overbasing calcium. More suitably, the amount of carbon dioxide is from about 0.78 to about 0.90 mole per mole of overbasing calcium, while preferably the amount of carbon dioxide, on the same basis, is from about 0.80 to about 0.85 mole.

DETAILED DESCRIPTION

Materials Used

The oil-soluble dispersing agents used in my process include only the oil-soluble sulfonic acids. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloalkyl (i.e., naphthenic) groups in the side chains attached to the benzene ring. The alkyl groups in the alkyl hydrocarbons can be straight or branched chain. The aryl radical of the alkaryl hydrocarbons can be phenyl, ethylphenyl, tolyl, xylyl, or naphthyl, but preferably is phenyl.

An example of a hydrocarbon feedstock which has been particularly useful in preparing synthetic sulfonic acids is a material known as postdodecylbenzene. Postdodecylbenzene is a bottoms products of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D-158 Engler: | |
|   I.B.P., °F. | 647 |
|   5, °F. | 682 |
|   50, °F. | 715 |
|   90, °F. | 760 |
|   95, °F. | 775 |
|   F.B.P. °F. | 779 |
| Refractive Index at 23° C. | 1.4900 |
| Viscosity at— | |
|   −10° C., centistokes | 2800 |
|   20° C., centistokes | 280 |
|   40° C., centistokes | 78 |
|   80° C., centistokes | 18 |
| Aniline point, °C. | 69 |
| Pour Point, °F. | −25 |

An example of another hydrocarbon feedstock which is particularly useful in preparing synthetic sulfonic acids is a material referred to as "dimer alkylate." "Dimer alkylate" consists primarily of aryl compounds having one long branched-chain alkyl group. Briefly described, dimer alkylate is prepared by the following steps:

(1) dimerization of a suitable feedstock, such as cat poly gasoline;
(2) alkylation of an aromatic hydrocarbon with the dimer formed in step (1).

Preferably, the dimerization step uses a Friedel-Crafts alkylation sludge as the catalyst. This process and the resulting product are described in U.S. Pat. No. 3,410,925.

An example of still another hydrocarbon feedstock is a material similar to "dimer alkylate," but which has one substantially straight long-chain alkyl group.

An example of yet another hydrocarbon feedstock which is particularly useful for preparing synthetic sulfonic acids which can be used in my invention is a material which is the bottoms product resulting from the preparation of a biodegradable detergent alkylate (i.e., a substantially straight-chain monoalkylbenzene), and which is referred to as "NAB Bottoms." "NAB Bottoms" are predominantly di-n-alkyl aromatic hydrocarbon wherein the alkyl groups contain from 8 to 18 carbon atoms. They are distinguished primarily from the preceding sulfonation feedstocks in that they are both straight chain and contain a large amount of di-substituted material. The process of preparing these materials and the resulting product are described in application Ser. No. 521,794, filed Jan. 20, 1966 and now abandoned and having the same assignee as the present application. Another process of preparing a di-n-alkaryl product is described in application Ser. No. 529,284, filed Feb. 23, 1966 and now abandoned, and having the same assignee as the present application.

In order to make my disclosure even more complete, applications Ser. Nos. 521,794 and 529,284 and U.S. Pat. No. 3,410,925 are made a part of this disclosure.

In addition to the sulfonic acids derived from the foregoing-described hydrocarbon feedstock, examples of other suitable sulfonic acids include the following: mono- and poly- wax-substituted naphthalene sulfonic acid, dinonyl naphthalene sulfonic acid, diphenyl ether sulfonic acid, naphthalene disulfide sulfonic acid, dicetyl thianthrene sulfonic acid, dilauryl beta-naphthol sulfonic acid, dicapryl nitronaphthalene sulfonic acid, unsaturated paraffin wax sulfonic acid, hydroxy substituted paraffin wax sulfonic acid, tetra-amylene sulfonic acid, mono- and poly-chlorosubstituted paraffin wax sulfonic acid, nitrosoparaffin wax sulfonic acid; cyclo-aliphatic sulfonic acid such as lauryl-cyclohexyl sulfonic acid, mono- and poly-wax-substituted cyclohexyl sulfonic acid, and the like.

In addition to the sulfonic acids described in the foregoing, mixtures of these sulfonic acids can be used.

Usually, the commercially available sulfonic acids are not 100 percent sulfonic acid but contain some nonvolatile diluent oil. The amount of nonvolatile diluent oil can range from about 5 to about 90 parts by weight per 100 parts of sulfonic acid. Expressed on the same basis, more suitably the amount of nonvolatile diluent oil is from about 10 to about 60 parts by weight. Preferably, on the same basis, the amount of nonvolatile diluent oil is from about 15 to about 50 parts by weight.

A wide variety of nonvolatile diluent oils are suitable since the principal requisite is that they act as a solvent for the dispersing agent. The term "nonvolatile diluent oil" as used herein refers to both the unsulfonated feedstock and to intentionally added materials. In some cases these intentionally added materials are added during the sulfonation of the feedstock and are therefore concurrently present in the sulfonic acid starting material. These oils have a boiling point in excess of about 200° C. Examples of suitable nonvolatile diluent oils, other than the unsulfonated hydrocarbons, include mineral lubricating oils obtained by any of the conventional refining procedures; liquid synthetic lubricating oils, such as polymers of propylene, polyoxyalkylenes, polyoxypropylene, dicarboxylic acid esters, such as esters of adipic and azelaic acids with alcohols such as butyl, 2-ethylhexyl and dodecyl alcohols; hydrocarbon synthetic lubricating oils, such as di-n-$C_{8-18}$ alkylbenzenes, alkyl-substituted tetrahydronaphthalenes, diphenylalkanes, and mixtures thereof; vegetable oils, such as corn oil, cotton seed oil, and caster oil; animal oils, such as lard oil and sperm oil. The more suitable nonvolatile diluent oils are the mineral lubricating and the synthetic hydrocarbon lubricating oils, as defined hereinbefore. The preferred nonvolatile diluent oils are the mineral lubricating oils.

Suitable volatile solvents include both aromatic and aliphatic hydrocarbon solvents having a boiling point below about 150° C. Examples of suitable solvents include benzene, toluene, xylene, heptane, hexane, and petroleum naphtha. The preferred solvents are the aliphatic hydrocarbons, e.g., hexane or petroleum naphtha.

My invention is restricted to methanol as the alcohol since neither ethanol nor isopropanol works in my process, although many of the prior art processes teach that $C_1-C_3$ or $C_1-C_6$ alkanols can be used to prepare hyperbasic dispersions. In addition, it is of interest that the alkoxy ethanols (e.g., methoxy ethanol) do not work in my process since the prior art teaches that alkoxy ethanols can be used to prepare hyperbasic dispersions.

Either calcium oxide or calcium hydroxide can be used in my process. In some instances when the oil-soluble dispersing agent is an acid and/or contains a small amount of water it is preferable to use sufficient calcium oxide, first in the process, to neutralize the acid and, if necessary, convert the free water to calcium hydroxide. Preferably, calcium hydroxide is used to provide the overbasing. A commercial grade of calcium oxide or calcium hydroxide can be used. Of course, it is readily apparent to anyone skilled in this art that it is desirable to use as pure a material as commercially feasible since less unreacted material will have to be removed by filtration.

Amounts of Materials

The relative amounts of materials used, except the nonvolatile diluent oil, are shown below in tabular form.

| Material | Parts by weight | |
| --- | --- | --- |
| | Suitable | Preferred |
| Dispersing agent | 5-30 | 10-20 |
| Methanol | 5-30 | 10-20 |
| Volatile solvent | 10-50 | 20-35 |
| CaO or Ca(OH)$_2$ | *1-25 | *10-20 |

*This amount is characterized further in that it is sufficient to provide an acetic base number (measure of overbasing calcium) in the product of at least 50, more suitably at least 100, and preferably at least 200.

The amount of nonvolatile diluent oil present in the initial admixture is better understood when considered in connection with the sulfonic acids, as described hereinbefore, and with that amount of nonvolatile diluent oil used in the process, as described hereinafter. Actually, it is not required that any nonvolatile diluent oil be present in the initial admixture. From a practical viewpoint there is usually at least 0.25, more usually at least 0.50, part of nonvolatile diluent oil present in the initial admixture. The amount of nonvolatile diluent oil used in my process suitably is that amount required to provide from about 20 to 85 parts per 100 parts of the combined weight of dispersing agent and nonvolatile diluent oil in the final product. Expressed on the same basis preferably the amount of nonvolatile diluent oil is from about 40 to about 60 parts.

The amount of nonvolatile diluent oil added to the admixture after carbonation is dependent on the amount of nonvolatile diluent oil present in conjunction with the dispersing agent. When the dispersing agent is a natural sulfonic acid or sulfonate, little, if any, nonvolatile diluent oil is added. When the dispersing agent is a sulfonic acid or sulfonate prepared from a synthetic hydrocarbon, usually addition of a nonvolatile diluent oil is necessary in order to provide a final product having sufficient fluidity.

Process Conditions

In conducting the process of my invention an admixture is first formed of the oil-soluble dispersing agent, volatile hydrocarbon solvent, methanol and calcium oxide or calcium hydroxide. While the entire amount of nonvolatile diluent oil can be added to the initial admixture, preferably this is not done. Preferably, the only nonvolatile diluent oil present in the initial admixture is that which is concurrently present in the dispersing agent. In this connection, it is my hypothesis that the presence of a minimum amount of nonvolatile diluent oil in the initial admixture provides better phase mixing between the dispersing agent and the methanol.

Even though this may be redundant, let me summarize the statements concerning the nonvolatile diluent oil:

(1) Preferably, the only nonvolatile diluent oil present in the initial admixture is that present concurrently with the dispersing agent.
(2) Since oil-soluble dispersing agents contain some nonvolatile diluent oil there will usually be at least a small amount present.
(3) Natural sulfonic acids contain usually more nonvolatile diluent oil than sulfonic acids derived from synthetic hydrocarbon feedstocks.
(4) When nonvolatile diluent oil is added during the process preferably at least one-half is added after carbonation.

The admixture is then carbonated, preferably by blowing with $CO_2$, while the temperature of the admixture does not exceed about 35° C. Carbonation of the admixture can be begun when the temperature is as low as 10°

C. In order to prevent the admixture from becoming viscous and thereby having poor contact with the $CO_2$, it is important that the temperature be at least about 22° C. by the time at least one-fourth, preferably at least one-third, of the amount of $CO_2$ required in this first carbonation step is added.

In order to insure consistent results it is often desirable that this first carbonation step be conducted at a temperature in the range of from about 22 to about 35° C., preferably from about 23 to about 30° C.

The carbonation step is an important feature of my process. First, the carbonation is conducted at a relatively slow rate. For example, the time of carbonation should be in the range of from about 0.25 to about 8 hours, preferably in the range of from about 1 to about 3 hours. Within the ranges previously stated, the time of carbonation varies with the size of the batch with larger batches requiring longer time periods. Secondly, the amount of carbon dioxide added at this stage is very important. An insufficient amount of carbon dioxide results in a low utilization of lime (i.e., amount converted to final product). The unreacted lime increases the solids content of the final product and results in poor filtration. An excessive amount of carbon dioxide decreases the stability of the product. As a result, instead of a fluid dispersion, the product is grease-like. In order to use the correct amount of carbon dioxide the amount of overbasing calcium present in the admixture must be known and the amount of carbon dioxide added must be measured.

With the foregoing conditions in mind a suitable amount of carbon dioxide is above 0.75 mole and less than 0.95 mole per mole of overbasing calcium. More suitably, the amount of carbon dioxide is from about 0.78 to about 0.90 mole per mole of overbasing calcium while preferably the amount of carbon dioxide, on the same basis, is from about 0.80 to about 0.85 mole.

Following the carbonation step it is often desirable, in order to provide better contact of the various reactants, to heat the admixture to reflux temperature and maintain the temperature at reflux for a short time.

At this point the additional nonvolatile diluent oil, as required, is added to the admixture. The volatile materials are then substantially removed by heating the admixture, as for example to a pot temperature of about 150° C. When large batches of product are prepared (e.g., 12 liters and above), it usually requires three to four hours to remove substantially all of the nonvolatile materials.

The admixture is then blown with carbon dioxide, generally while it is maintained at the final heating temperature. This blowing with carbon dioxide at this point serves to convert substantially all of the remaining CaO or $Ca(OH)_2$ to calcium carbonate. In addition, the blowing with carbon dioxide serves to remove traces of volatile materials, such as solvent and water.

Generally, the product is filtered or centrifuged to remove suspended materials, i.e., unreacted lime and impurities in the lime added initially.

In order to disclose the nature of the present invention still more clearly, the following examples, both illustrative and comparative, will be given. It is to be understood that the invention is not to be limited to the specific conditions or details set forth in these examples except insofar as such limitations are specified in the appended claims.

EXAMPLE 1

This example provides a series of runs of 12-liter batches which show that the $CO_2/Ca$ ratio is very important.

Materials Used

| | |
|---|---:|
| Sulfonic acid [1] _____grams__ | 2180 |
| $Ca(OH)_2$—(commercial hydrated lime) ___do____ | 471 |
| Methanol _____ml__ | 750 |
| 100 pale oil (a solvent refined mineral lubricating oil from a Mid-continent base stock having a viscosity of 100 S.S.U. at 100° F.) _____grams__ | 486 |

[1] This acid was prepared from a 70/30 blend of two feedstocks. The feedstocks contained 70 percent of a monoalkylbenzene from dimerized dodecene and 30 percent of stripped "NAB Bottoms," which contain substantial amounts of di-n-alkylbenzenes and have been described previously herein. The sulfonic acid solution had the following analysis:

| | |
|---|---:|
| Sulfonic acid _____percent__ | 26.3 |
| Unsulfonated alkylate and diluent oil _____do____ | 21.1 |
| Hexane _____do____ | 52.6 |
| Residual sulfuric acid _____do____ | 0.05 |
| Combining weight of sulfonic acid _____ | 440 |
| Total acidity _____meq./g__ | 0.609 |
| Sulfonic acidity _____meq./g__ | 0.598 |
| Nonvolatiles _____percent__ | 47.4 |

Procedure

The following general procedure was used:

The sulfonic acid solution, $Ca(OH)_2$ and one-half the methanol were added to a 12-liter creased flask. The remaining methanol was added. The admixture was cooled to the carbonation temperature indicated in Table I below. The amount of $CO_2$ indicated in Table I was added while maintaining the temperature at that indicated in the table. The carbonation was conducted over a two-hour period. The partially carbonated admixture was heated to reflux temperature (~50° C.) over a 45-minute period and held at reflux temperature for 15 minutes. The 100 pale oil was added, following which the volatile materials were removed by heating to a pot temperature of 150° C. over a period of three to four hours. While the temperature was about 150° C. the admixture was blown with $CO_2$ to convert any $Ca(OH)_2$ present to $CaCO_3$ and to remove residual solvents and water. The samples for the filtration and B.S. and W. tests were removed before settling of the product occurred.

The process variables and product results are shown in Table I below.

The data in the above-listed table show the following:

(1) Use of a $CO_2/Ca$ mole ratio of 0.75 and below results in low utilization of $Ca(OH)_2$ and a product which does not filter.

(2) Use of a $CO_2/Ca$ mole ratio of 0.95 and above results in a thick, grease-like product—not a fluid dispersion.

TABLE I

| Run | Moles $CO_2$ per mole overbasing Ca | Carbonation temperature, ° C. | Product, grams | Utilization of $Ca(OH)_2$, percent | B.S. and W.,[1] ml. ppt./100 g. product | Acetic base No.[2] | Filtration [3] |
|---|---|---|---|---|---|---|---|
| A | 0.70 | 20–25 | 2,027 | 80.5 | 7.2 | 254 | Would not filter. |
| B | 0.75 | 24±1 | 2,041 | 91.5 | 4.5 | 273 | Do. |
| C | 0.80 | 29±1 | 2,050 | 96.7 | 1.9 | 295 | 5 minutes. |
| D | 0.85 | 29±1 | 2,055 | 96.6 | 1.6 | 293 | Do. |
| E | 0.90 | 29±1 | 2,050 | 94.5 | 2.6 | 289 | 6 minutes. |
| F | 0.95 | 29±1 | 2,045 | Grease-like product—barely poured at 150° C. | | | |
| G and H | 1.1 | 20–25 | Both runs became very milky and viscous with semi-solid material on the sides of reaction vessel at 70° C. during distillation of solvent | | | | |

[1] The precipitate was obtained by diluting 100 grams of the product to 200 ml. total volume with n-hexane and centrifuging 20 minutes at 1,500 r.p.m.
[2] On clarified product.
[3] The filtrations were run on 150 grams of product slurried with 2% (wt.) "HYFLO"* and filtered through a "HYFLO" precoat. The filtrations were carried out using a heated coarse sintered glass funnel (600 ml.). The time recorded indicates the time required to produce a dry condition on the top of the filter cake.
*"HYFLO" is a diatomaceous earth filter aid.

EXAMPLE 2

This example shows that use of a carbonation temperature above the suitable range not in excess of 35° C., while using the preferred range of $CO_2/Ca$, does not produce a satisfactory product.

The materials used and general procedure were the same as in the runs in Example 1.

The mole ratio of $CO_2$/mole of overbasing Ca was 0.80.

The carbonation temperature was 40–42° C.

The product weighed 2027 grams and was slightly hazy and fluid. The product contained 3.0 grams precipitate per 100 grams and was very difficult to filter. It would barely filter even with constant scraping.

EXAMPLE 3

This example illustrates the preparation of a pilot plant batch of the product prepared by the process of my invention.

Materials Used

| | Lbs. |
|---|---|
| Sulfonic acid (A) [1] | 253.2 |
| Sulfonic acid (B) [2] | 124.8 |
| Methanol | 91.7 |
| $Ca(OH)_2$ (commercial grade) | 74.2 |
| 80 pale oil (a mineral lubricating oil similar to that used in Example 1, except it had a viscosity of 80 S.S.U. at 100° F.) | 91.7 |
| $CO_2$ gas (0.807 moles of $CO_2$/mole overbasing Ca, i.e. the amount above that required to neutralize the sulfonic acid) | 32.3 |
| Total charge | 667.9 |

[1] This material was a hexane solution of a sulfonic acid prepared by the sulfonation of "NAB Bottoms," as described previously herein. The solution had the following analysis:

| | Percent |
|---|---|
| Hexane | 56.3 |
| Water | 0.5 |
| Sulfonic acid (molecular weight 438) | 24.7 |
| Nonvolatile diluent oil and unsulfonated hydrocarbon | 18.5 |

[2] This was a hexane solution of a sulfonic acid prepared by the sulfonation of a mono-long chain ($C_{20-24}$) alkylbenzenes. The solution had the following analysis:

| | Percent |
|---|---|
| Hexane | 65.05 |
| Water | 0.35 |
| Sulfonic acid (molecular weight 514) | 21.2 |
| Nonvolatile diluent oil and unsulfonated hydrocarbon | 13.4 |

Procedure

The procedure used was as follows:

The sulfonic acids, $Ca(OH)_2$ and one-half of the methanol were added to the reaction vessel and the admixture cooled to 30° C. The admixture was then carbonated by blowing $CO_2$ through a sparger at the bottom of the reaction vessel over a period of 106 minutes while maintaining the temperature within the range of 25–30° C. Over a 30 minute period the reaction mass was heated to reflux (~50° C.), and held at reflux temperature for five minutes. Then the 80 pole oil was added, following which the volatile materials were removed by heating to a pot temperature of 150° C. over a three-hour period. The product was $CO_2$ stripped for one hour at 150° C.

The amount of product recovered was 331.5 pounds which after filtration had the following analysis:

| | |
|---|---|
| Base No. (acetic) | 283%. |
| Percent active (calcium sulfonate) | 28.26%. |
| Viscosity at 210° F. | 180.5 S.S.U. (38.46 cs.). |

The product was bright and fluid.

EXAMPLE 4

This example illustrates the preparation of a plant batch of the product prepared by the process of my invention.

Materials Used

| | Lbs. |
|---|---|
| Sulfonic acid solution [1] | 9576 |
| Methanol | 2772 |
| CaO (amount required to neutralize the acid) | 160 |
| $Ca(OH)_2$ (Mississippi lime-grease maker grade) | 2050 |
| Mineral lubricating oil (viscosity of 75 S.S.U. at 100° F.) | 3085 |
| $CO_2$ (0.775 mole $CO_2$/mole overbasing Ca) | 890 |

[1] The sulfonic acid solution was a hexane solution of mixed sulfonic acids corresponding to that used in Example 3. The sulfonic acid solution had the following composition:

| | Lbs. |
|---|---|
| Sulfonic acid | 2633.4 |
| Water | 52.7 |
| Unsulfonated alkylate and oil | 909.7 |
| Volatile solvents (hexane) | 5980.2 |
| Total | 9576.0 |

Procedure

The procedure used was as follows.

The sulfonic acid solution, methanol and calcium oxide were added first to the reaction vessel. The $Ca(OH)_2$ was then added and the admixture cooled to 23° C. The carbon dioxide was added over a period of three hours six minutes at a rate of about 5 pounds per minute. During the carbonation step the maximum temperature was 30.5° C. The admixture was then heated to remove a substantial portion of volatile solvents and when the temperature reached 53° C. the mineral lubricating oil was added. The resulting admixture was heated to a product temperature of 150° C. to remove substantially all of the solvents. The product was blown with $CO_2$ for one hour at a rate of 5 pounds $CO_2$ per minute while the temperature of the admixture was held within the range of 150–160° C. The product was further stripped for one hour and 45 minutes with a plant inert gas (having the following composition: 12% $CO_2$, 1% CO, and 87% $N_2$) to remove the last traces of solvent.

Prior to filtrating the product had the following properties:

| | |
|---|---|
| Acetic base number | 301 |
| Flash Point, ° F. | 385 |
| B. S. & W., percent [1] | 3.6 |

[1] See footnote 1 below.

After filtering, the product had the following properties:

| | |
|---|---|
| Acetic base number | 292 |
| Percent active (calcium sulfonate) | 30.8 |
| B. S. & W.[1] | Trace |
| Viscosity, cs. at 210° F. | 48.1 |

[1] In this example the B.S. & W. was the percent precipitate based on the product when 50 ml. product is diluted with 50 ml. hexane and centrifuged 20 minutes at 1500 r.p.m.

The products of this example were filtered using a plant filtering press using 3.7% diatomaceous earth filter and a yield of 850 gallons of product was obtained in 35–40 minutes with very little pressure buildup, thereby indicating excellent filtering properties for the product.

EXAMPLE 5

This example is comparative and shows that ethanol (absolute) and isopropyl do not work in the process of my invention. Twelve liter preparations made using a mole ratio $CO_2$ overbased Ca of approximately 0.80. The details of the runs are shown below.

RUN A

Materials Used

| | | |
|---|---|---|
| Sulfonic acid soultion* | grams | 2180 |
| Isopropanol (Mallinckrodt Co.-analytical reagent grade 0.2% $H_2O$ maximum | ml | 750 |
| $CaOH_2$ (commercial grade) | grams | 471 |
| 100 pale oil | do | 486 |
| $CO_2$ (101.8 liters) | do | 199.9 |

*The sulfonic acid solution was the same as used in Example 1.

Procedure

The procedure used was substantially the same as in Example 1.

The $CO_2$ was added over a period of 115 minutes. During the $CO_2$ blowing it was necessary to heat the admixture to maintain the temperature at 30±1° C. rather than cooling which was used when methanol was used.

During the $CO_2$ blowing a wet test meter was used to measure the amount of $CO_2$ not reacted, which was 63.0 liters of $CO_2$. In addition, during the heating to reflux temperature 5.8 liters of additional $CO_2$ were released.

The product weighed 1935 grams and a B.S. & W. test, using 50 grams of product and 50 ml. of hexane, gave a result of 40% (amount of material precipitated).

The results of this run are summarized in Table II.

RUN B

Material Used

| | | |
|---|---|---|
| Sulfonic acid solution* | grams | 2180 |
| Ethyl alcohol-absolute (U.S.P.–N.F., U.S. Industrial Chemicals Co.) | ml | 750 |
| Commercial hydrated lime | grams | 471 |
| 100 pale oil | do | 486 |
| $CO_2$ (104.8 liters) | do | 205.8 |

*The sulfonic acid solution was the same as used in Run A and Example 1.

Procedure

The procedure used was substantially the same as in Example 1. The $CO_2$ was added over a period of 115 minutes. During the $CO_2$ blowing it was again necessary, as in Run A, to heat the admixture in order to maintain the temperature at 30±1° C.

A wet test meter was used to measure the amount of $CO_2$ not reacted, which amounted to 84.0 liters of $CO_2$. During the heating to reflux 9.05 additional liters of $CO_2$ were released.

The product weighed 909 grams and a B.S. & W. test using the same procedure as in Run A gave a result of 45%. The results of this run are summarized in Table II. In addition for purposes of comparison the third column of Table II contains the results of a substantially similar run using methanol as the alcohol.

TABLE II

| | Run number | | |
|---|---|---|---|
| Alcohol | A—Isopropanol | B—Ethanol | Methanol |
| $CO_2$ added, g.¹, liters | 199.9 | 205.8 | 206.9 |
| Liters of $CO_2$ not reacted during carbonation | 63.0 | 84.0 | 0.83 |
| Total $CO_2$, not reacted, g | 68.8 | 93.05 | 0.83 |
| Wt. of product, g | 1,935.0 | 1,909.0 | 2,038.0 |
| Percent B.S. and W | 40 | 45 | 2.4 |
| Acetic base No | 51 | 32 | 296 |

¹ 0.80 mole ratio of $CO^2$/overbasing Ca=200.4 g.

EXAMPLE 6

A series of runs were made which show the effect of beginning the carbonation at a temperature as low as 10° C. Three 1-liter and one 12-liter runs were made. The sulfonic acid used in all of the runs was prepared from a mono- and dialkylbenzene mixture. The sulfonic acid had the following analysis:

| | |
|---|---|
| Total acidity, meq./g. | 1.30 |
| Sulfonic acid acidity, meq./g. | 1.25 |
| Combining weight | 455 |
| Water, percent wt. | 0.10 |
| Nonvolatiles, percent | 98.7 |

| | Run number | |
|---|---|---|
| Amounts of materials | A–C | D |
| Sulfonic acid, g | 101.3 | 1,013 |
| Hexane, g | 129.2 | 1,292 |
| Methanol, ml | 75.0 | 750 |
| CaO, g. (for neutralization) | 3.7 | 37 |
| $Ca(OH)^2$, g. (grease-maker lime) | 43.6 | 436 |
| Mineral lubricating oil, 500 S.S.U. at 100° F., g | 44.2 | 442 |

Procedure—Run A

The sulfonic acid and hexane were added to the reaction flask. Then the methanol, CaO, and $Ca(OH)_2$ were added to the flask. Using an ice bath the admixture was cooled to 10° C. The admixture was then blown with $CO_2$ for 13 minutes while maintaining the temperature in the range of 10–12° C. (The total amount of $CO_2$ was sufficient to provide 0.85 moles per mole of overbasing Ca.) It was observed during the $CO_2$ addition that the admixture became very viscous after about one-half the $CO_2$ was added and some $CO_2$ was lost (as measured by a wet test meter) presumably due to poor contact between the $CO_2$ and reaction mass.

Upon completion of the $CO_2$ blowing the admixture was heated to reflux temperature, maintained at this temperature for 30 minutes, whereupon the mineral lubricating oil was added. The admixture was heated to 150° C. to remove volatile materials, and then stripped with $CO_2$ gas for 15 minutes at 150–160° C. The yield of product was 202.3 grams. The product was hazy and fluid. Fifty-two grams of product were removed for B.S. & W. tests and 150 grams were filtered using "Hyflo" diatomaceous earth filter aid.

The process conditions and product analyses are summarized in Table III which follows.

Procedure—Run B

The procedure was the same as in Run A except that the temperature during carbonation was 15.5–17° C. Again, the admixture became very viscous after about one-half the $CO_2$ was added.

The yield of product was 202.5 grams. The product was bright and fluid.

The process conditions and product analyses are summarized in Table III which follows.

Procedure—Run C

The procedure was the same as in Run A except that the temperature during carbonation was in the range of 23.3 to 24.4° C. The admixture was very fluid during the carbonation and substantially no $CO_2$ (0.02 liter) was given off. The yield of product, which was fluid and hazy, was 203.1 grams.

The process conditions and product analyses are summarized in Table III which follows.

Procedure—Run D

The procedure was the same as in Runs A–C except for the following differences. As indicated previously, this run used an amount 10 times that in Runs A–C. Accordingly, a 12-liter reaction flask was used. Also, the carbonation time was 131 minutes as compared to 13 minutes for the Runs A–C. The carbonation was conducted over a temperature range of 10 to 32° C. The carbonation was started at 10° C. After about one-fourth of the $CO_2$ had been added the temperature was 21° C. After one-half the $CO_2$ was added, the temperature was 30° C.

Although 4 liters of $CO_2$ were lost during the blowing, some of the loss may have been mechanical since the glass frit tube may not have been sufficiently below the surface of the admixture.

The admixture was very fluid during the $CO_2$ blowing. The yield of product, which was very fluid and only slightly hazy, was 2067 g.

The process conditions and product analyses are summarized in Table III which follows.

TABLE III

| Run number | A | B | C | D |
|---|---|---|---|---|
| Size, liter | 1 | 1 | 1 | 12 |
| Carbonation temp., °C | 10–12 | 15.5–17 | 23.3–24.4 | 10–32 |
| $CO_2$/Ca, mole ratio | 0.85 | 0.85 | 0.85 | 0.85 |
| $CO_2$ off during carb., liter | 0.6 | 1.0 | 0.02 | 4.0 |
| $CO_2$ added, liter | 11.24 | 11.24 | 11.24 | 112.4 |
| Product BS and W., percent [1] | 2.4 | 2.4 | 2.2 | 0.9 |
| Filter time, minutes [2] | 9 | 4.5 | 8 | 4.25 |
| Percent Hyflo [2] | 2 | 4 | 2 | 2 |
| Filtered product base No. | 300 | 298 | 301 | 301 |
| Percent B.S. and W. | <0.005 | <0.005 | <0.005 | 0.03 |

[1] Unfiltered.
[2] The filter time is the time to obtain a dry cake when 150 g. of the product slurried with the filter aid at 150° C., is filtered through a 7 cm. diameter heated Büchner funnel.

While it is believed to be inherent from the description of the test procedures as stated previously herein, the B.S. & W. test is a measure of the precipitate produced on diluting the product with a hydrocarbon solvent (e.g. hexane) and centrifuging the resulting solution. It is an indication of the amount of the sediment (or precipitate) which would result when the product is used as an additive in lubricating oils.

Having thus described the invention by providing specific examples thereof, it is to be understood that no undue limitations or restrictions are to be drawn by reason thereof and that many variations and modifications are within the scope of the invention.

The invention having thus been described, what is claimed and desired to be secured by Letters Patent is:

1. A process for preparing a stable dispersion of calcium carbonate in a nonvolatile diluent oil wherein the process comprises:
   (A) forming an admixture of
      (1) about 5 to about 30 parts by weight of an oil soluble dispersing agent selected from the group consisting of oil soluble sulfonic acids and the calcium salts thereof,
      (2) about 10 to about 50 parts by weight of a volatile hydrocarbon solvent having a boiling point below about 150° C.,
      (3) about 5 to about 30 parts by weight methanol,
      (4) at least about 0.25 parts by weight of a nonvolatile diluent oil having a boiling point of above about 200° C, and
      (5) from about 1 to about 25 parts by weight of calcium oxide, calicum hydroxide or mixtures thereof, said amount being characterized further in that it is sufficient to provide an acetic base number of at least 50 in the final product,
   (B) treating the admixture of step (A) with an amount of carbon dioxide which is above 0.75 and less than 0.95 mole, per mole of overbasing calcium, while the admixture is at a temperature not exceeding about 35° C.,
   (C) adding to the admixture of step (B) an amount of nonvolatile diluent oil sufficient to bring the total of the nonvolatile diluent oil to about 20 to about 85 parts per 100 parts of the combined weight of the oil soluble dispersing agent and nonvolatile diluent oil,
   (D) heating the admixture to remove substantially all of the volatile materials, and
   (E) blowing the admixture of step (D) with carbon dioxide to convert substantially all of the remaining calcium oxide or calcium hydroxide to calcium carbonate.

2. The process of Claim 1 wherein in step (B) the temperature is at least about 22° C. by the time at least one-fourth of the carbon dioxide requirement is added.

3. The process of Claim 2 wherein the nonvolatile diluent oil is selected from the group consisting of mineral lubricating oils and synthetic hydrocarbon lubricating oils, such as di-n-$C_{8-18}$ alkylbenzenes, alkyl-substituted tetrahydronaphthalenes, diphenylalkanes and mixtures thereof.

4. The process of Claim 3 wherein the amount of carbon dioxide in step (B) is from about 0.78 to about 0.90 mole per mole of overbasing calcium.

5. The process of Claim 4 wherein the amount of nonvolatile diluent oil added in step (C) is sufficient to bring the total amount of nonvolatile diluent oil to about 40 to about 60 parts per 100 parts of the combined weight of oil soluble dispersing agent and nonvolatile diluent oil.

6. The process of Claim 5 wherein the hydrocarbon solvent of step (A) is as aliphatic hydrocarbon.

7. The process of Claim 6 wherein the nonvolatile diluent oil is a mineral lubricating oil.

8. The process of Claim 7 wherein the entire amount of the carbon dioxide requirement of step (B) is added while maintaining the temperature of the admixture in the range of from about 22 to about 35° C.

9. A process for preparing a stable dispersion of calcium carbonate in a nonvolatile diluent oil, said stable dispersion being characterized as having an acetic base number of at least 100, wherein the process comprises:
   (A) forming an admixture of
      (1) about 10 to about 20 parts of an oil soluble dispersing agent selected from the group consisting of oil soluble sulfonic acids and the calcium salts thereof,
      (2) about 20 to about 35 parts of a volatile hydrocarbon solvent having a boiling point below about 150° C.,
      (3) about 10 to about 20 parts methanol,
      (4) at least about 0.5 parts of a nonvolatile diluent oil having a boiling point above about 200° C., and
      (5) about 10 to about 20 parts calcium oxide, calcium hydroxide or mixtures thereof, said amount being sufficient to provide an acetic base number of at least 100 in the final product,
   (B) treating the admixture of step (A) with from about 0.78 to about 0.90 mole of carbon dioxide, per mole of overbasing calcium, while the admixture is at a temperature not exceeding about 35° C.,
   (C) adding to the admixture of step (B) an amount of nonvolatile diluent oil sufficient to bring the total of the nonvolatile diluent oil to about 20 to about 85 parts per 100 parts of the combined weight of the oil soluble dispersing agent,
   (D) heating the admixture to remove substantially all of the volatile materials, and
   (E) blowing the admixture of step (D) with carbon dioxide to convert substantially all of the remaining calcium oxide or calcium hydroxide to calcium carbonate.

10. The process of Claim 9 wherein in step (B) the temperature is at least about 22° C. by the time at least one-fourth of the carbon dioxide requirement is added.

11. The process of Claim 10 wherein the nonvolatile diluent oil is selected from the group consisting of mineral lubricating oils and synthetic hydrocarbon lubricating oils, such as di-n-$C_{8-18}$ alkyl-benzenes, alkyl-substituted tetrahydronaphthalenes, diphenylalkanes and mixtures thereof.

12. The process of Claim 11 wherein the amount of nonvolatile diluent oil added in step (C) is sufficient to bring the total amount of nonvolatile diluent oil to about 40 to about 60 parts per 100 parts of the combined weight of oil soluble dispersing agent and nonvolatile diluent oil.

13. The process of Claim 12 wherein the hydrocarbon solvent of step (A) is an aliphatic hydrocarbon.

14. The process of Claim 13 wherein the nonvolatile diluent oil is a mineral lubricating oil.

15. The process of Claim 14 wherein the oil soluble dispersing agent is an oil soluble sulfonic acid.

16. The process of Claim 15 wherein the oil soluble dispersing agent is an oil soluble sulfonic acid prepared by sulfonation of a synthetic hydrocarbon selected from the group consisting of mono-alkaryl hydrocarbons, di-alkaryl hydrocarbons and mixtures thereof.

17. The process of Claim 16 wherein the amount of calcium oxide, calcium hydroxide or mixtures thereof used in step (A) (5) is sufficient to provide an acetic base number of at least 200 in the final product.

18. The process of Claim 15 wherein the entire amount of the carbon dioxide requirement of step (B) is added while maintaining the temperature of the admixture in the range of from about 22 to about 35° C.

References Cited
UNITED STATES PATENTS

| | | | |
|---|---|---|---|
| 3,014,866 | 12/1961 | Ferm | 252—33.4 |
| 2,865,956 | 12/1958 | Ellis et al. | 252—33 |
| 3,488,284 | 1/1970 | Le Suer et al. | 252—33 |
| 3,470,097 | 9/1969 | Lavigne et al. | 252—33 |

DANIEL E. WYMAN, Primary Examiner
I. VAUGHN, Assistant Examiner

U.S. Cl. X.R.

252—33